United States Patent [19]

Vorbeck

[11] 4,215,649

[45] Aug. 5, 1980

[54] BABY TURTLE ISOLATION HABITAT

[75] Inventor: Donald W. Vorbeck, Napa, Calif.

[73] Assignee: Atco Manufacturing Co., Inc., Napa, Calif.

[21] Appl. No.: 931,147

[22] Filed: Aug. 4, 1978

[51] Int. Cl.$^2$ .............................................. A01K 1/00
[52] U.S. Cl. ........................................ 119/15; 119/17
[58] Field of Search ............... 119/1, 15, 17; 215/248, 215/308; 47/69; 55/384, 385 A, 518

[56] References Cited

U.S. PATENT DOCUMENTS

| | | | |
|---|---|---|---|
| 3,537,428 | 11/1970 | Montgomery | 119/15 X |
| 3,791,346 | 2/1974 | Willinger et al. | 119/17 |

FOREIGN PATENT DOCUMENTS 589163  2/1978  U.S.S.R. .................................... 215/308

Primary Examiner—Louis G. Mancene
Assistant Examiner—Robert P. Swiatek
Attorney, Agent, or Firm—James R. Cypher

[57] ABSTRACT

An isolation habitat for shipping, storing and displaying live baby turtles consisting of a bell shaped turtle chamber, a filter chamber communicating with the turtle chamber for receiving a microporous filter for air exchange and bacterial exclusion, a cap covering the filter chamber formed with perforations for air exchange and providing a positive clamp action to retain and protect the filter member, and a floor affixed to the bell shaped turtle chamber having traction means for permitting the turtle to right itself upon inversion. A separate literature and accessory chamber is snapped to the underside of the floor. In another form of the invention, absorbent shock proof material surrounds the turtle adjacent the floor of the bell chamber.

10 Claims, 5 Drawing Figures

U.S. Patent  Aug. 5, 1980  Sheet 1 of 2  4,215,649
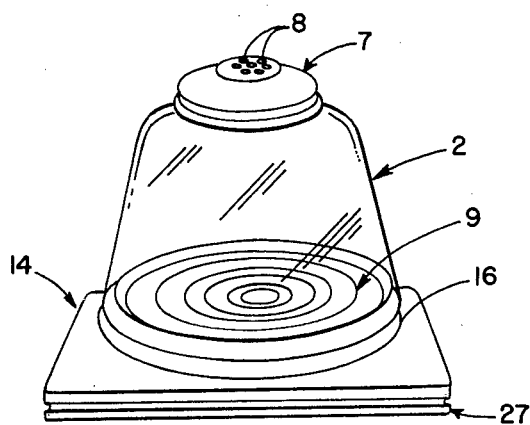
FIG. 1
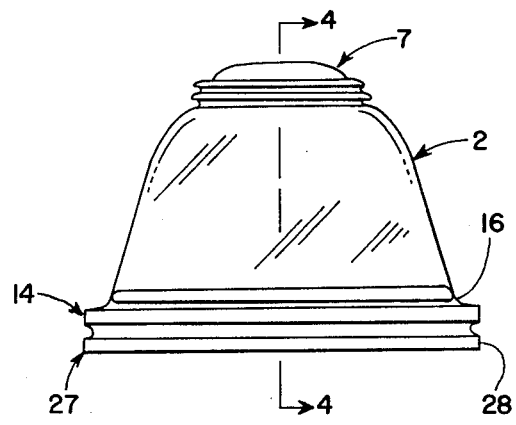
FIG. 3
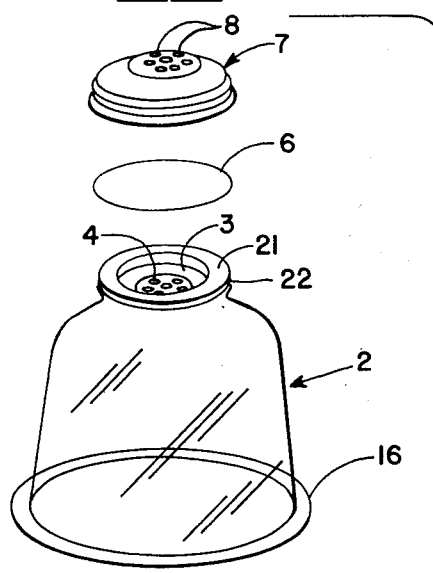
FIG. 2
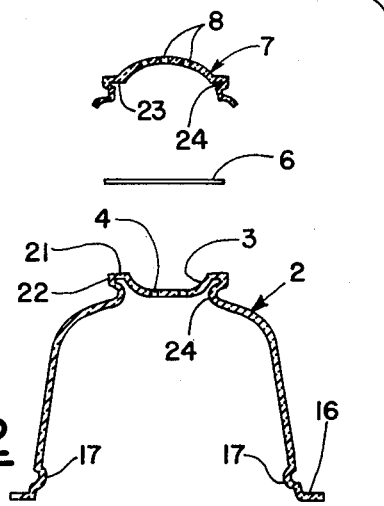
FIG. 4
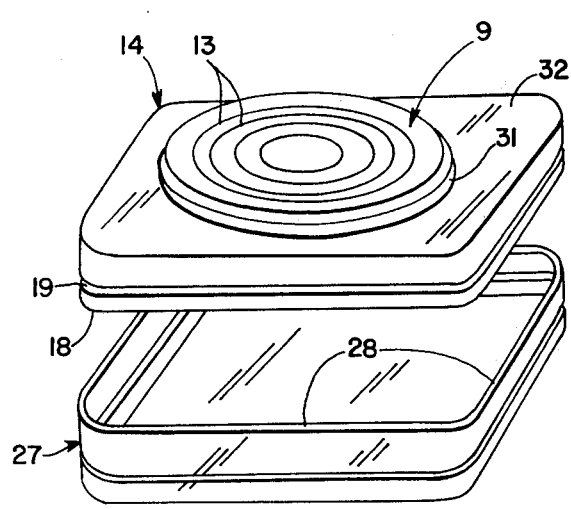

BABY TURTLE ISOLATION HABITAT

BACKGROUND

The raising and selling of baby turtles for pets was once an active industry in the United States. Nearly every child in the United States at one time or another had his own pet baby turtle. For several years, no sales have been permitted in the United States because of the likelihood that the turtles carried the bacteria salmonella. Recently, researchers have learned to produce salmonella free baby turtles. Approval to sell these salmonella-free turtles awaits only a life sustaining isolation container in which the turtles can be placed for storage and shipment to pet stores.

Baby turtles can live without food and water for approximately one year provided they are kept in a cool dark environment. They can survive without food and water because they have two stomachs; filled with an egg yolk food material. If light or warmth reaches the turtle, they become active and use up their yolk supply more quickly.

SUMMARY OF THE INVENTION

The gist of the present invention is the use of a turtle isolation chamber for holding a turtle and a filter chamber fitted with a microporous filter which permits the passage of oxygen into the turtle chamber and carbon dioxide out of the turtle chamber but prevents the passage of bacteria out of the turtle chamber; particularly salmonella.

An object of the invention is to provide an inexpensive, lightweight disposable shipping container in which an individual live baby turtle may be stored, shipped, and attractively displayed at retail stores.

Another object is to provide a holding container which will permit the turtle to right itself within the container should it become inverted due to the incorrect positioning of the shipping carton or chamber itself.

A further object is to provide an isolation habitat which cannot be opened without actually breaking a seal to insure the integrity of the habitat from the shipping point to the point of purchase.

Still another object is to provide a literature and accessory chamber which is part of the isolation habitat and gives further structural integrity to the chamber yet does not detract from the aesthetic features of the habitat.

Another object is to provide a shipping container which will provide cushioning to eliminate any harmful shock from impact due to accidental dropping of the shipping cartons or isolation habitats themselves.

BRIEF DESCRIPTION OF THE DRAWINGS

FIG. 1 is a perspective view of the isolation chamber of the present invention.

FIG. 2 is an exploded perspective view of the parts of the chamber shown in FIG. 1.

FIG. 3 is a side elevation view of the chamber shown in FIG. 1.

FIG. 4 is an exploded cross sectional view of the parts of the chamber shown in FIG. 3 taken generally along line 4—4 of FIG. 3.

DESCRIPTION OF THE PREFERRED EMBODIMENTS

Figure 5:
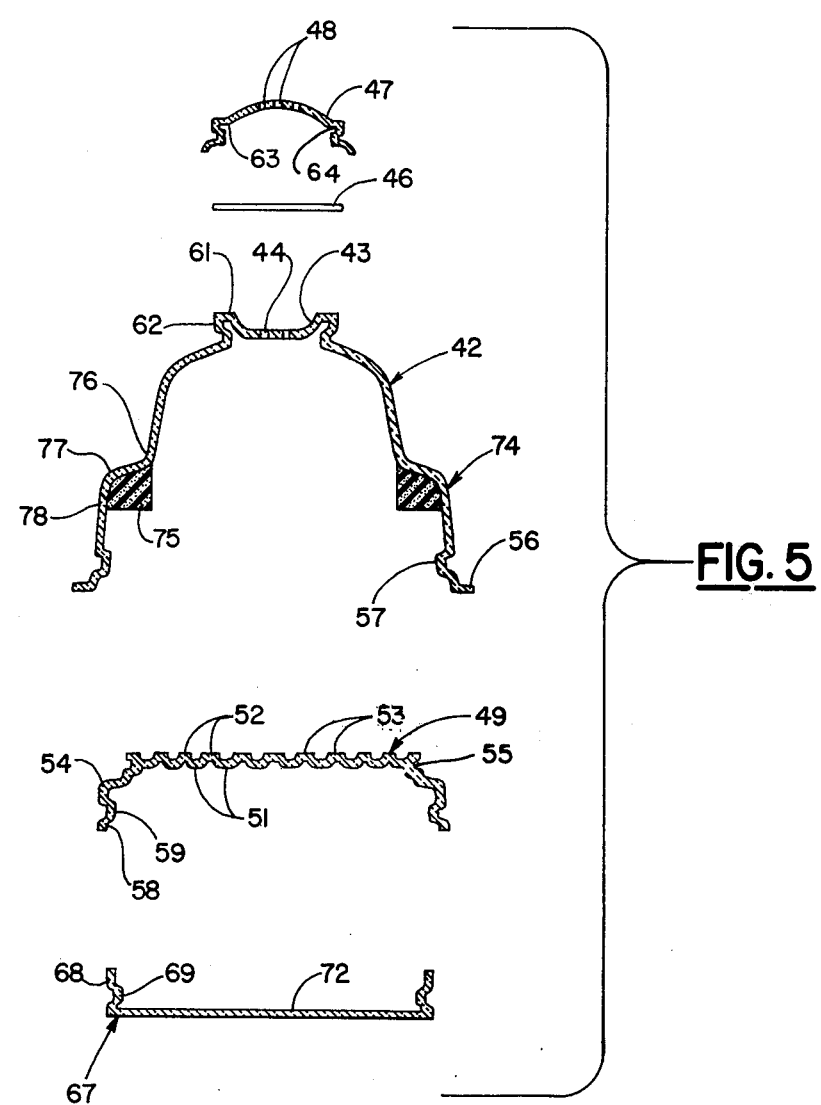
FIG. 5 is an exploded cross sectional view of the parts of a modified form of the chamber shown in the previous figures.

The baby turtle isolation habitat of the present invention consists of a clear plastic turtle chamber 2 having a width and height to restrain the turtle from substantial movement, yet adequate room for the turtle to right itself should it become inadvertently inverted. A filter chamber 3 is formed in the exterior wall of the plastic living chamber and communicates with multiple openings 4 in the wall with the interior of the living chamber. A microporous filter element 6 dimensioned for receipt within the filter chamber is placed therein. A sealing cap 7 is sealably connected to the filter chamber for retaining and protecting the microporous filter and is formed with multiple openings 8 for passage of air therethrough to the filter chamber.

Preferably, the isolation habitat is provided with a floor 9 having a traction surface to enable the turtle to right itself. One means of forming the traction surface is to form indentations 11 and ridges 12 having a depth and width sufficient to receive, hold and give traction to the foot of the turtle so that it can turn itself over. In the illustrations, the floor is formed with concentric circles 13 formed by a mold.

As shown in the drawings, the floor of the isolation habitat may be formed as a separate part 14. The turtle chamber may also be formed with a bottom flange 16 for sealing engagement with the floor member. The seal may be accomplished by chemical, heat or irradiation sealing means. Preferably, the seal between the turtle chamber flange and the floor should be such that the entire package must be destroyed to break the seal. In this way, simple inspection can determine whether the seal has been broken.

For ease in assembly, the turtle chamber may be formed with a plurality of protrusions 17 and the floor member is formed with an annular flange 18 and an annular detent 15 in rim 31 for snap registration with the protrusions 17 in the turtle chamber.

As illustrated in FIG. 4, the filter chamber is formed with an annular seat 21 and an annular protrusion 22. The microporous filter is dimensioned for engagement with the annular seat. The sealing cap is also formed with an annular flange 23 dimensioned for holding the microporous filter against the annular seat formed on the filter chamber. The sealing cap may be also formed with an annular indent 24 for snap fitting resilient sealing engagement with the annular protrusion 22 on the filter chamber.

A base member 27 formed with upstanding sidewalls 28 may be provided to form an enclosed space below the floor 9. Coupling means may be provided to releasably hold the base member to the floor member. In order to form a coupling, the walls of the base member may be formed with an indent 29 therein. The protrusion 19 in the floor member registers with the indent 29 of the base member to provide snap fitting engagement.

The turtle chamber is preferably made from a transparent plastic so that the turtle may be observed by all persons responsible for packaging, inspecting, shipping, storing and selling the turtle. The package should be clear so that the prospective purchaser may make a visual determination of the health, shell color, size and other matters which go into the selection. The plastic chosen should have resilient flexibility so that the chamber will not crack or split under normal shipping conditions yet be sufficiently rigid so that it will retain its shape during this period of time. The shape of the chamber may take a variety of configurations. A successful shape is that of a bell or dome. This shape gives the living chamber good structural strength. The overall chamber size is critical. It must have sufficient width to permit the turtle to stand or lie flat upon the floor, and sufficient height so the turtle can turn itself over should it inadvertently become inverted. The height of the chamber should not be so great that the turtle cannot grasp the openings 4 in the filter chamber and the foot holds 11 and 12 in the floor at the same time. The openings 4 should be large enough to permit the turtle to establish a toe hold but not so large as to permit the turtle to reach its toenails through the opening and puncture the microporous filter 6. The filter chamber must have sufficient depth so that the turtle cannot stick its toenails through the opening far enough to reach the underside of the filter.

The microporous filter may be made of polycarbonate which is a linear polyester of carbonic acid. Another microporous filter which may be used is cellulosic acetate. The openings in the filter are about 0.6 micrometers or smaller. The filter must pass air but not bacteria such as salmonella.

The cap 7 as previously explained fixes the microporous filter in place and protects it from external damage. The air holes in the cap provide ambient air access to the microporous filter. The cap provides clamp action on the filter circumference. The cap has a snap fitting for ease of assembly. Where required, the cap can be affixed to the main living chamber by chemical or heat seal processes.

The floor of the turtle chamber is preferably flat with concentric indents. As illustrated in the drawings, the floor is only supported at its rim 31 and then there is a wide flange area 32 surrounding the floor edge. This structure provides resilient spring action to reduce the shock transmitted to the turtle if the package is accidentally dropped.

The base member of the package may be round or square as shown. One advantage of the square package is to hold the turtle chamber firmly within the carrying carton. Further, by forming a space between the floor of the chamber and the floor 33 of the base, literature on the care of the turtle and other accessories for its support may be carried with the turtle.

FIG. 5 illustrates a modified form of the present invention. The baby turtle isolation habitat consists of a clear plastic turtle chamber 42 having a width and height to restrain the turtle from substantial movement, yet adequate room for the turtle to right itself. A filter chamber 43 is formed in the exterior wall of the chamber and communicates with multiple openings 44 in the wall with the interior of the living chamber. A microporous filter element 46 dimensioned for receipt within the filter chamber is placed therein. A sealing cap 47 is sealably connected to the filter chamber for retaining and protecting the microporous filter and is formed with multiple openings 48 for passage of air to the filter chamber.

The isolation habitat is provided with a floor 49 having a traction surface to enable the turtle to right itself. Indentations 51 and ridges 52 having a depth and width sufficient to give traction to the foot of the turtle are formed in the floor. The floor is formed with concentric circles 53 formed by a mold.

The floor of the isolation habitat is formed as a separable part 54. The turtle chamber is formed with a bottom flange 56 for sealing engagement with the floor member.

The turtle chamber is formed with a plurality of protrusions 57 and the floor member is formed with an annular detent 55 for snap registration with the protrusions 57 in the turtle chamber.

The filter chamber is formed with an annular seat 61 and an annular protrusion 62. The microporous filter is dimensioned for engagement with the annular seat. The sealing cap is also formed with an annular flange 63 dimensioned for holding the filter against the annular seat formed on the filter chamber. The sealing cap is formed with an annular indent 64 for snap fitting resilient sealing engagement with the annular protrusion 62 on the filter chamber.

A base member 67 formed with a base wall 72 and an upstanding sidewall 68 may be provided to form an enclosed space below the floor 49. Coupling means are provided to releasably hold the base member to the floor member. The walls of the base member are formed with an indent 69 therein. The protrusion 59 in the floor member registers with the indent 69 of the base member to provide snap fitting engagement.

The turtle chamber has generally the same shape and dimensions as the turtle chamber illustrated in FIGS. 1–4 except that the lower portion 74 is flared outwardly to accommodate an annular ring 75 of porous, shock resistant material. As illustrated, the flared shape consists of a sharply curved portion 76, a shoulder portion 77 and a downwardly extending wall 78. The ring 75 may be constructed from a polyurethane sponge rubber. This type of material can also absorb moisture, collect debris and provide cushioning for the turtle against lateral shock.

A space between the floor of the chamber and the floor 72 of the base is provided for the receipt of literature on the care of the turtle.

I claim:
1. A live baby turtle isolation habitat comprising:
   a. a plastic turtle chamber formed by an exterior enclosing wall and ceiling wall and said chamber having sufficient width and height to permit said turtle to stand in an upright position and to right itself should it become inadvertently inverted and said ceiling wall being formed with a plurality of air openings dimensioned to permit insertion of the toe nails only of said turtle therethrough;
   b. a filter chamber formed in said exterior wall of said plastic turtle chamber and communicating with said air openings in said ceiling wall with the interior of said chamber;
   c. a microporous filter member positioned within said filter chamber;
   d. spacer means holding said filter away from said ceiling wall openings a sufficient distance so that said toe nails of said turtle cannot pierce said filter member; and
   e. a sealing cap sealably connected to said filter chamber for retaining and protecting said filter element and formed with a plurality of cap openings for passage of air therethrough to said filter chamber.
2. A turtle habitat as described in claim 1 comprising:
   a. said habitat is provided with a floor having a traction surface to enable said turtle to right itself; and
   b. means formed in said exterior enclosing wall of said turtle chamber gradually diminishing the cross sectional area of said turtle chamber from said floor to said ceiling wall for absorbing shock when said isolation habitat is inadvertently decelerated so as to throw said turtle against said ceiling.

3. A turtle habitat as described in claim 2 comprising:
a. said floor is formed with indentations having a depth and width sufficient to receive, hold and give traction to the foot of said turtle;
b. a floor flange connected to and extending radially outwardly from said floor of said habitat; and
c. said floor flange is made from a flexible material thereby providing a shock absorbing structure if said turtle isolation habitat is inadvertently decelerated so as to cause said turtle to be thrown against said floor.

4. A turtle habitat as described in claim 3 comprising:
a. said floor of said habitat is formed from a separable part;
b. a rim connected to said floor and extending upwardly therefrom; and
c. said plastic turtle chamber enclosing wall is dimensioned and formed to register and seal with said rim connected to said floor.

5. A turtle habitat as described in claim 4 comprising:
a. said plastic turtle chamber exterior wall is formed with a plurality of protrusions; and
b. said rim connected to said floor member is formed with an annular detent for snap registration with said protrusions in said rim.

6. A turtle habitat as described in claim 4 comprising:
a. said floor of said habitat is formed with a downwardly extending flange;
b. a base member formed with upstanding sidewalls forming an enclosed space therein; and
c. coupling means releasably holding said base member to said floor member.

7. A turtle habitat as described in claim 6 comprising:
a. said walls of said base member are formed with an indent therein; and
b. said flange of said floor member is formed with a protrusion registering with said indent of said wall of said base member providing a snap fitting engagement.

8. A turtle habitat as described in claim 7 comprising:
a. said side walls of said plastic turtle chamber are formed with a radially outward flair forming an annular chamber;
b. an annular ring substantially filling said annular chamber; and
c. said ring is formed from a material providing lateral shock resistance to protect said turtle.

9. A turtle habitat as described in claim 1 comprising:
a. said filter chamber is formed with an annular seat and an annular protrusion;
b. said filter member is dimensioned for engagement with said annular seat; and
c. said sealing cap is formed with an annular flange dimensioned for holding said filter member against said annular seat formed on said filter chamber, and is formed with an annular indent for snap fitting engagement with said annular protrusion on said filter chamber.

10. A turtle habitat as described in claim 1 comprising:
a. said plastic turtle chamber enclosing wall and ceiling wall are formed in a bell-shape.

* * * * *